April 15, 1930.   R. KILLICK   1,754,323
COLOR PROJECTION APPARATUS FOR CINEMATOGRAPHS
Filed April 20, 1923   3 Sheets-Sheet 1

INVENTOR:
Reginald Killick,
By Edward Williams
Attorney.

April 15, 1930.  R. KILLICK  1,754,323
COLOR PROJECTION APPARATUS FOR CINEMATOGRAPHS
Filed April 20, 1923   3 Sheets-Sheet 2

INVENTOR:
Reginald Killick,
By Edward Williams
Attorney.

April 15, 1930.   R. KILLICK   1,754,323
COLOR PROJECTION APPARATUS FOR CINEMATOGRAPHS
Filed April 20, 1923   3 Sheets-Sheet 3

INVENTOR:
Reginald Killick,
By Edward Williams
Attorney.

UNITED STATES PATENT OFFICE

REGINALD KILLICK, OF LONDON, ENGLAND, ASSIGNOR TO THE K. & S. SYNDICATE LIMITED, OF LONDON, ENGLAND, A BRITISH COMPANY

COLOR-PROJECTION APPARATUS FOR CINEMATOGRAPHS

Application filed April 20, 1923, Serial No. 633,433, and in Great Britain June 26, 1922.

The object of this invention is to provide an improved color projection apparatus for cinematographs which is specially suitable for application to existing or ordinary cinematographic projection apparatus without change in design of the latter.

This invention consists in an attachment adapted to be fitted to the spindle of a standard cinematographic projector comprising gearing driven by the spindle and a color shutter operated thereby at an appropriate speed said shutter being used alone or in conjunction with a standard shutter mounted on the spindle.

The accompanying drawings illustrate my invention, Figs. 1 and 2 being a plan view and a sectional elevation respectively of the shutter mechanism. Fig. 3 is an end view showing the epicyclic gear used for operating one or both shutters.

Figure 1:
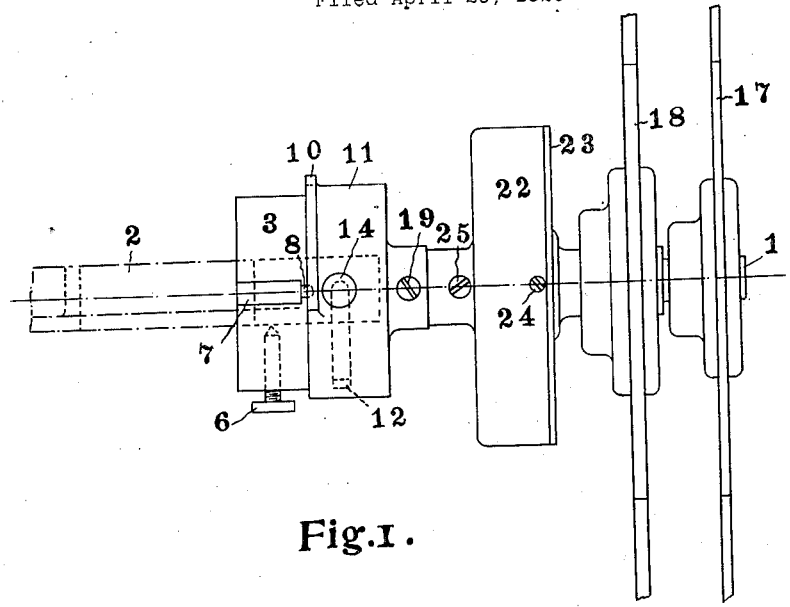
Figure 2:
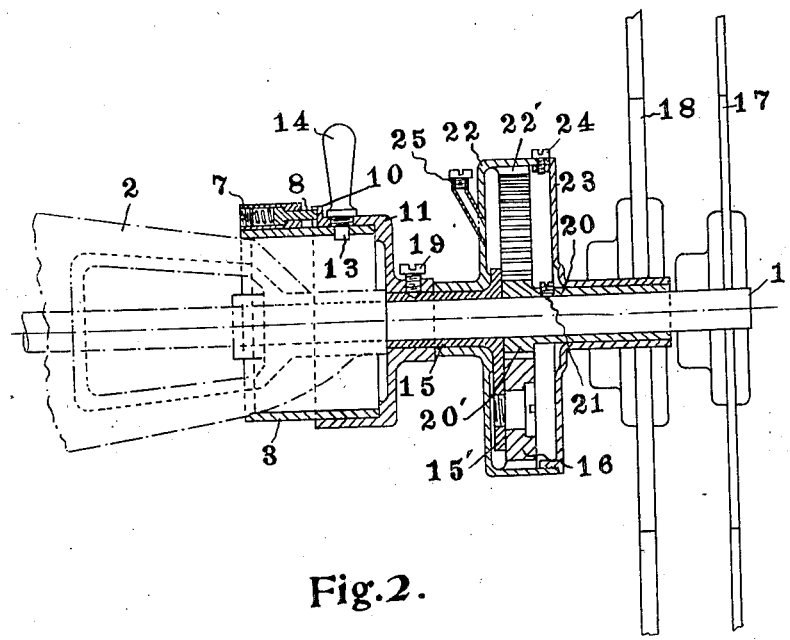

In the form of my invention illustrated 1 represents the shaft of an ordinary projector which is carried in a bearing formed in a bracket 2. In order to secure my improved shutter fitting to this bracket I provide a member 3 into which the end of the bracket extends, relative movement between the member and bracket being prevented in any convenient manner as for example by providing an end piece 4 for the member 3 having an aperture 5 shaped so as to permit of the entrance of the end of the bracket 2. It will be understood the shape of aperture 5 will not always be the same as different standard projectors have different shaped brackets. In some standard types of projector there is no projecting bracket and in such cases the member 3 may be secured directly to the casing of the projector in any convenient manner as for example by providing the member with a flange which can be secured to the casing by means of screws or bolts. In the example illustrated set screw 6 serves to hold the bracket 2 and member 3 in their relative positions. A small tube 7 is rigidly secured on the periphery of the member 3 and contains a spring pressed plunger 8 adapted to engage a flange 10 carried on the periphery of a cup-shaped member 11 which surrounds a cylindrical portion of member 3 and is capable of rotary motion relatively thereto. The members 3 and 11 when in working relationship constitute an elastic frictional coupling. To hold members 3 and 11 in their relative longitudinal positions a groove or slot 12 is formed in member 3 through or into which a projection 13 carried by a handle 14 projects. The handle is screwed into the member 11 and by turning the handle with sufficient force to overcome the friction of the plunger 8 on flange 10 the member 11 and the parts secured thereto can be rotated relatively to the member 3 through a distance depending on the length of slot 12. This slot may extend round a quarter of the circumference when the gearing driving the shutter is 4 to 1, as in the example illustrated. The length of the slot however is determined by the ratio of the gearing but it may be further extended to correct for "streaming" when a combination shutter such as hereinafter described is used if the machine is in operation with the shutter improperly set in relation to the film.

Surrounding the shaft or spindle 1 is a sleeve 15 carrying a radially extending plate 15' on which is mounted a pinion 16. The member 11 is secured to this sleeve 15 by means of a set screw 19 so that the position of plate 15' may be varied by turning the handle 14. The standard shutter 17 is secured directly to the spindle 1 when the shutter construction permits of this and the color shutter 18 is mounted in close proximity thereto on a tubular member adapted to rotate on a sleeve 20 surrounding the spindle 1 and secured thereto by a screw 21. On the inner end of sleeve 20 is a pinion 20' adapted to gear with the pinion 16. Mounted so as to rotate on sleeve 15 is a casing 22 having an internal gear wheel 22' cut in it, this gear wheel being adapted to mesh with the pinion 16. The casing 22 is closed by means of a plate or disc 23 having a tubular member or sleeve formed integral or secured to it on which the color shutter is carried. The disc 23 may be screwed into the casing 22 and fixed relatively thereto by means of a screw 24. In order to lubricate the gearing an oil conduit 25 provided with a screwed cap is provided so that oil or other lubricant can be inserted into the casing.

In some forms of projector the spindle 1 does not extend beyond the machine casing to permit of the standard shutter being mounted on it after the mechanism just described has been fitted in place and in this case I extend the tubular member 20 a sufficient distance to take the shutter. As this member 20 is fixed to the spindle 1 by means of the screw 21 it will rotate at the same speed as the spindle and therefore the speed of the shutter will be the same as if it were mounted directly on the spindle.

Figures 3, 4:
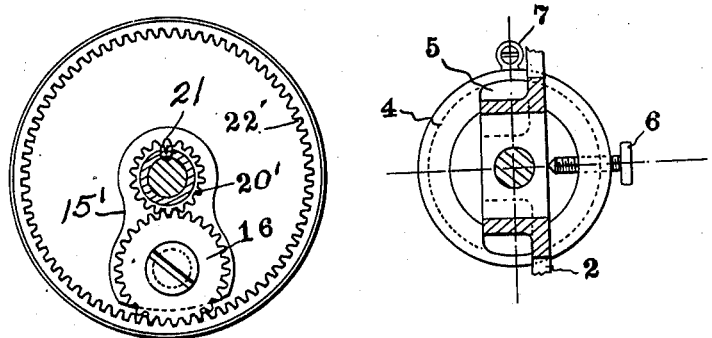
Fig. 4 is an end view showing the method of securing the shutter mechanism to the bracket of a projector.

The operation of the mechanism is as follows: When a film is in place and the projector driving mechanism is in operation the standard shutter 17 rotates at the speed of spindle 1. As the sleeve 20 is secured to the spindle, this sleeve with pinion 20' will also rotate at the same speed as the spindle 1. The pinion 16 with which pinion 20' meshes is held against rotation about the axis of spindle 1 by means of plate 15' and therefore the motion of pinion 20' will be transmitted through 16 to the internal wheel 22' and this wheel and its casing 22 and disc 23 with the color shutter mounted on its sleeve will rotate at a speed depending on the number of teeth on the wheel and pinions. I usually prefer to so design the gearing that the speed of the shutter is a third or a quarter that of the standard shutter but the exact relative speeds of the two shutters forms no part of the present invention. In the arrangement shown in Fig. 3 the gearing is designed so that the color shutter will rotate at a quarter the speed of the standard shutter and in the opposite direction. If desired the two shutters may be made to rotate in the same direction by mounting a second pinion on plate 15' transmitting the motion from pinion 20' to pinion 16.

To adjust the position of the colored shutter relatively to the film in the event of the film being wrongly placed in the gate of the projector that is, with a positive picture, which has been printed from a negative taken through a red filter being projected through the blue-green filter of the color shutter, or vice versa, the handle 14 is rotated through a quarter of a revolution when the shutters have a four to one speed ratio. This rotation of the handle 14 causes a corresponding rotation of the plate 15' carrying pinion 16 which in turn causes the wheel 22' to gain or lose one quarter of a revolution relatively to the spindle 1 and the standard shutter 17. As the wheel 22' drives the color shutter this will also gain or lose a quarter of a revolution relatively to the main shutter depending on the direction of movement of the handle 14, thereby bringing the red filter into a position in which the picture which has been taken through a red filter is projected through it.

Figure 7:
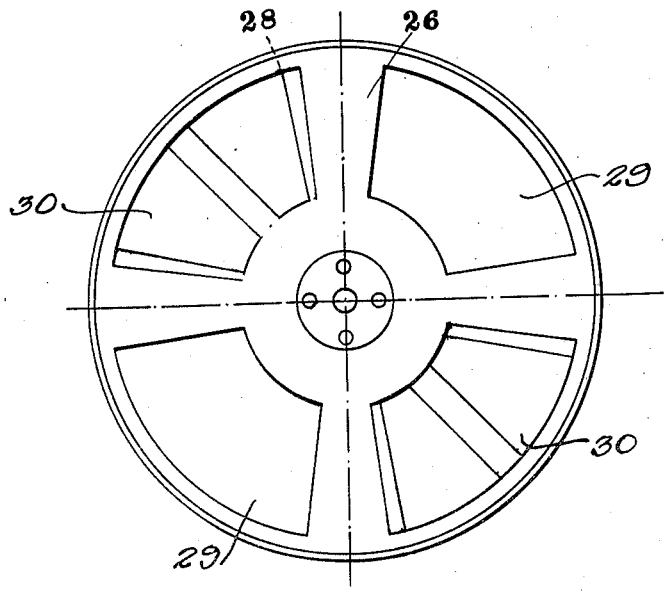
Fig. 6 is a similar view of the color shutter alone and Fig. 7 is a combined color and ordinary shutter.
Figure 5:
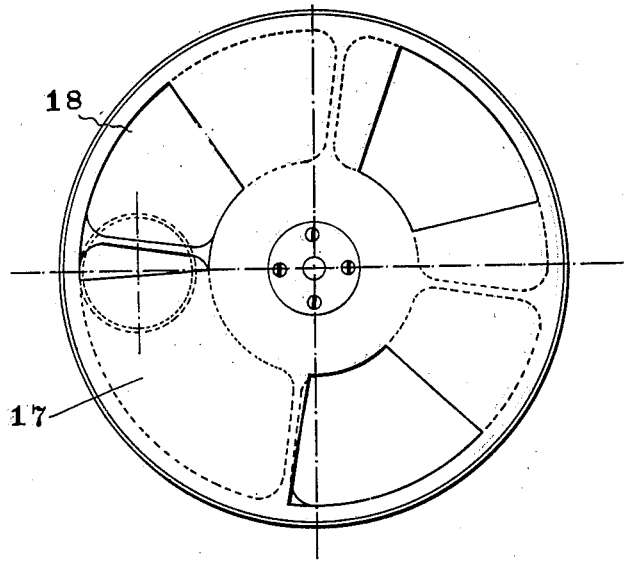
Fig. 5 is an elevation showing both standard and color shutters.
Figure 6:
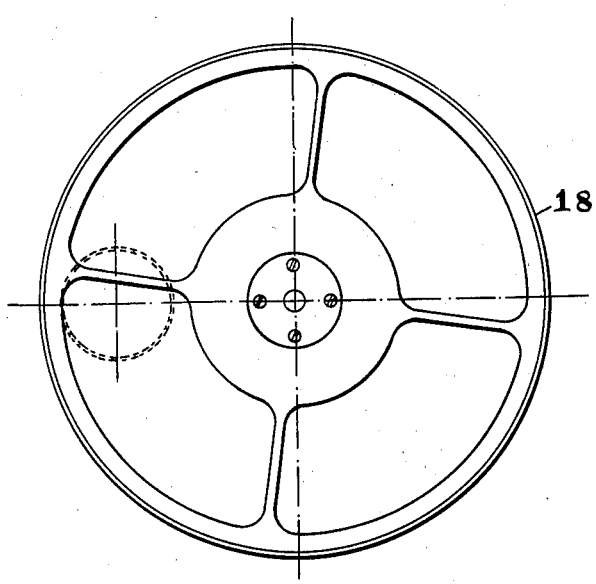

Fig. 5 shows the standard and color shutters in their relative positions and Fig. 6 the color shutter alone. The standard shutter may be any of the usual types the one shown being provided with three apertures and masking and flicker blades and the color shutter being provided with alternate red and blue-green filters through which the pictures are projected. In Fig. 7 I have shown a combination shutter in which the apertures are provided with alternate red and blue green filters 29 and 30 respectively separated by masking blades 26. As shown, the filters are the same length but as the blue green effect is retained longer by the eye than the red it is preferable to cut down the duration of the time the picture is projected through these filters and this may be done by providing a central flicker blade 27 on each blue green filter 30, or by cutting down the length of the filter by inserting a flicker blade 28 at each end. These flicker blades serve to minimize pulsation.

By using a combination shutter such as illustrated driven by the mechanism above described the use of two shutters is avoided. When a standard machine is being used for projecting black and white pictures a standard shutter is mounted on the end of the spindle 1, the combination shutter being removed and the gearing being allowed to rotate idly.

When the machine is to be used with a standard shutter for a prolonged period if the gearing were left rotating idly it would be subjected to an unnecessary amount of wear and to obviate this it is only necessary to unscrew plate 23 and withdraw pin 21 when the entire attachment can be removed.

When a color picture is to be shown the standard shutter is removed and the combination shutter secured to the sleeve of plate 23 and the standard spindle is utilized to drive this shutter at the appropriate speed depending on the ratio of the gears used. It will thus be seen that the same machine may be used for projecting black and white pictures by the use of a standard shutter only or for projecting color pictures either by the use of a standard shutter running at the usual speed and a color shutter running at a speed proportional to the standard shutter or by the use of a combination shutter driven through the gearing at a speed proportional to, but slower than the standard spindle.

It will be seen that an attachment and shutter such as above described may be fitted to any type of standard projector. As the brackets of different standards differ in shape the aperture in plate 4 will have to be shaped differently for different types of standard machines but as these plates can be readily fitted within the member 3 if a stock of plates having apertures adapted to fit the various makes of machines is kept, the attachment can be quickly fitted to any machine. As stated above where the standard projector has no bracket a flange may be substituted for plate 4 and standard flanges kept in stock.

What I claim as new and desire to secure by Letters Patent of the United States is:—

1. In combination with a cinematographic device having a revoluble spindle, an attachment therefor comprising, a stationary sleeve member, an angularly adjustable cup-shaped member frictionally engaging said sleeve, an intermediate gear, an intermediate gear support secured to the cup-shaped member on which the intermediate gear turns, a driving gear on said spindle meshing with the intermediate gear, a driven gear meshing with the intermediate gear, an enclosing casing for the gears secured to and revolving with said driven gear, a shutter secured to the casing, and manual means carried by the cup-shaped member for adjusting the position thereof to vary the angular position of the intermediate gear support to position the openings in the shutters.

2. A color projection attachment for standard cinematographic devices having a frame, a revoluble spindle and the usual shutter, comprising a securing member for attachment to said frame, a casing revolubly mounted on said spindle and carrying a color screen rotating in juxtaposition to said shutter and cooperating therewith, and a geared driving connection from said spindle to and within said casing to maintain the proper speed and phase relation between said shutter and said color screen in accordance with the number of colors being projected and the speed of the shutter with respect to the film.

3. A color projection attachment for standard cinematographic devices having a frame, a revoluble spindle and the usual shutter, comprising a securing member for attachment to said frame, a casing having an opening fitting over the spindle and rotatable thereon, a color screen mounted on said casing in juxtaposition to said shutter and cooperating therewith in the projection of colored pictures, a geared driving connection, having a movable intermediate gear, from said spindle to and within said casing to maintain the proper speed between said shutter and said color screen in accordance with the number of colors being projected and the speed of the shutter with respect to the film, and a manually operable member on the securing member for actuating said intermediate gear in said driving connections to adjust the phase relation between said shutter and said color screen.

4. A color projection attachment for standard cinematographic devices having a frame, a revoluble spindle and the usual shutter, comprising a securing member for engaging said frame, a casing revolubly mounted on said spindle and carrying a color screen rotating in juxtaposition to said shutter and cooperating therewith, and a geared driving connection, having a movable intermediate gear, from said spindle to and within said casing to maintain the proper speed relation between said shutter and said color screens in accordance with the number of colors being projected and the speed of the shutter with respect to the film, an intermediate gear of said driving connection being adjustably supported from said frame to vary the phase relation between said shutter and said color screen.

5. A color projection attachment for standard cinematographic devices having a frame, a revoluble spindle and the usual shutter, comprising a securing member for engaging said frame, a casing revolubly mounted on said spindle and carrying a color screen rotating in juxtaposition to said shutter and cooperating therewith, and a geared driving connection between said spindle and color screen to maintain the proper speed relation between said shutter and said color screen in accordance with the number of colors being projected and the speed of the shutter with respect to the film, said connection comprising an internal gear on said casing, a pinion fixed to said spindle, and an intermediate gear meshing with said internal gear and said pinion, adjustably supported from said frame to vary the phase relation between said shutter and said color screen.

In witness whereof I have hereunto set my hand this 10th day of April, 1923.

REGINALD KILLICK.